United States Patent
Suh et al.

(10) Patent No.: US 8,854,428 B2
(45) Date of Patent: Oct. 7, 2014

(54) METHOD FOR PROCESSING THREE DIMENSIONAL (3D) VIDEO SIGNAL AND DIGITAL BROADCAST RECEIVER FOR PERFORMING THE METHOD

(75) Inventors: Jong Yeul Suh, Seoul (KR); Jeong Hyu Yang, Seoul (KR)

(73) Assignee: LG Electronics, Inc., Seoul (KR)

( * ) Notice: Subject to any disclaimer, the term of this patent is extended or adjusted under 35 U.S.C. 154(b) by 268 days.

(21) Appl. No.: 13/144,560

(22) PCT Filed: Dec. 18, 2009

(86) PCT No.: PCT/KR2009/007599
§ 371 (c)(1),
(2), (4) Date: Jul. 14, 2011

(87) PCT Pub. No.: WO2010/107174
PCT Pub. Date: Sep. 23, 2010

(65) Prior Publication Data
US 2012/0007948 A1    Jan. 12, 2012

Related U.S. Application Data

(60) Provisional application No. 61/161,757, filed on Mar. 19, 2009.

(51) Int. Cl.
*H04N 15/00* (2006.01)
*H04N 13/00* (2006.01)

(52) U.S. Cl.
CPC ....... *H04N 13/0066* (2013.01); *H04N 13/0048* (2013.01); *H04N 13/0022* (2013.01); *H04N 2213/003* (2013.01)
USPC .. 348/43; 348/42; 348/E13.062; 348/E13.072

(58) Field of Classification Search
CPC .......... H04N 13/0055; H04N 19/00769; H04N 13/0239; H04N 13/0059; H04N 13/0048
See application file for complete search history.

(56) References Cited

U.S. PATENT DOCUMENTS

2005/0005307 A1* 1/2005 Kim ............................. 725/131
2006/0279750 A1* 12/2006 Ha ................................ 358/1.2

(Continued)

FOREIGN PATENT DOCUMENTS

CN    1954606 A    4/2007
CN    1998233 A    7/2007

(Continued)

OTHER PUBLICATIONS

Kugjin et al: "A DTV-Compatible 3DTV Broadcasting System", Consumer Electronics, 2006. ICCE '06.2006. Digest of Technical Papers. International Conference on Las Vegas, NV, USA Jan. 7-11, 2006, Piscataway, NJ, USA IEEE, Piscataway,NJ,USA, Jan. 7, 2006, pp. 149-150.

(Continued)

*Primary Examiner* — Dave Czekaj
*Assistant Examiner* — Nam Pham
(74) *Attorney, Agent, or Firm* — McKenna, Long & Aldridge LLP

(57) ABSTRACT

A method for processing a 3D video signal and a digital broadcast receiver for performing the processing method are disclosed. A method for receiving a 3D broadcast signal includes receiving signaling information of at least one stream for a 3 Dimension TeleVision (3DTV) service and a two dimensional (2D) video stream, demultiplexing at least one stream for the 3DTV service and the 2D video stream based on the signaling information, decoding at least one demultiplexed stream for the 3DTV service and the demultiplexed 2D video stream, and outputting a 3D video signal by formatting at least one decoded stream for the 3DTV service and the decoded 2D video stream.

8 Claims, 13 Drawing Sheets

(56) References Cited

U.S. PATENT DOCUMENTS

| | | | |
|---|---|---|---|
| 2007/0081814 A1* | 4/2007 | Ha et al. | 396/310 |
| 2007/0236493 A1* | 10/2007 | Horiuchi et al. | 345/419 |
| 2008/0303832 A1 | 12/2008 | Kim et al. | |
| 2008/0303893 A1 | 12/2008 | Kim et al. | |
| 2008/0310499 A1 | 12/2008 | Kim et al. | |
| 2009/0040372 A1* | 2/2009 | Bae et al. | 348/436.1 |
| 2009/0060273 A1* | 3/2009 | Stephan et al. | 382/103 |
| 2010/0315489 A1* | 12/2010 | Shepherd | 348/46 |

FOREIGN PATENT DOCUMENTS

| | | |
|---|---|---|
| WO | WO 2005/114998 | 12/2005 |
| WO | WO 2007/064159 A1 | 6/2007 |
| WO | WO 2007/067020 A1 | 6/2007 |
| WO | 2008/069613 A1 | 6/2008 |
| WO | WO 2009/027923 | 3/2009 |

OTHER PUBLICATIONS

Bourge et al: "MPEG-C Part 3: Enabling the Introduction of Video Plus Depth Contents", Philips Applied Technologies, Jun. 30, 2006.
Fehn et al: "An Evolutionary and Optimised Approach on 3D-TV", Internet Citation, Sep. 2002, XP002464365.
Ohm, Jens-Rainer: "Stereo/Multiview Video Encoding Using The MPEG Family of Standards", Proceedings of SPIE, SPIE—International Society for Optical Engineering, US, vol. 3639.Jan. 25, 1999, pp. 242-255, XP008022007.

* cited by examiner

FIG 2

| Syntax | No. of Bits | Format |
|---|---|---|
| terrestrial_virtual_channel_table_section() { | | |
|     table_id | 8 | 0xC8 |
|     section_syntax_indicator | 1 | '1' |
|     private_indicator | 1 | '1' |
|     reserved | 2 | '11' |
|     section_length | 12 | uimsbf |
|     transport_stream id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for(i=0;i<num_channels_in_section;i++){ | | |
|         short_name | 7*16 | uimsbf |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for(i=0;i<N;i++){ | | |
|             descriptor() | | |
|         } | | |
|     } | | |
|     reserved | 6 | '111111' |
|     additional_descriptors_length | 10 | uimsbf |
|     for(j=0;j<N;j++){ | | |
|         additional_descriptor() | | |
|     } | | |
|     CRC_32 | 32 | rpchof |
| } | | |

FIG 3

| Value | Type |
|---|---|
| 0x10 | 3DTV service-The virtual channel carries 3D television programming (audio, video, and associated 3D metadata) |

FIG 4

| Syntax | No. of bits | Format |
|---|---|---|
| 3D_service_location_descriptor_VCT ( ) { | | |
|     descriptor_tag | 8 | 0xTBD |
|     descriptor_length | 8 | uimsbf |
|     reserved | 3 | '111' |
|     PCR_PID | 13 | uimsbf |
|     reserved | 1 | '1' |
|     number_elements | 7 | uimsbf |
|     for (j=0; j<number_elements; j++) { | | |
|         data_type | 8 | uimsbf |
|         reserved | 3 | '111' |
|         elementary_PID | 13 | uimsbf |
|         codec_type | 8 | uimsbf |
|         reserved | 3 | '1111' |
|         bit_depth_minus_1 | 4 | uimsbf |
|         same_resolution_flag | 1 | bslbf |
|         if (same_resolution_flag == 0) { | | |
|             horizontal_size | 16 | uimsbf |
|             vertical_size | 16 | uimsbf |
|         } | | |
| } | | |

FIG 5

| Syntax | No. of bits | Format |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | umisbf |
|     reserved | 4 | bslbf |
|     program_info_length | 12 | uimsbf |
|     for(i=0;i<N;i++) { | | |
|         descriptor() | | |
|     } | | |
|     for(i=0;i<N1;i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for(i=0;i<N2;i++) { | | |
|             descriptor() | | |
|         } | | |
|     } | | |
|     CRC_32 | 32 | rpchof |
| } | | |

FIG 6

| Syntax | No. of bits | Format |
|---|---|---|
| 3D_service_location_descriptor_PMT ( ) { | | |
|     descriptor_tag | 8 | 0xTBD |
|     descriptor_length | 8 | uimsbf |
|     codec_type | 8 | uimsbf |
|     reserved | 3 | '1111' |
|     bit_depth_minus_1 | 4 | uimsbf |
|     same_resolution_flag | 1 | bslbf |
|     if (same_resolution_flag == 0) { | | |
|         horizontal_size | 16 | uimsbf |
|         vertical_size | 16 | uimsbf |
|     } | | |
| } | | | understanding of the invention, illustrate

METHOD FOR PROCESSING THREE DIMENSIONAL (3D) VIDEO SIGNAL AND DIGITAL BROADCAST RECEIVER FOR PERFORMING THE METHOD

This application is a National Stage Entry of International Application No. PCT/KR2009/007599, filed on Dec. 18, 2009, and claims the benefit of U.S. Application No. 61/161,757, filed Mar. 19, 2009, both of which are hereby incorporated by reference for all purposes as if fully set forth herein in their entireties.

TECHNICAL FIELD

The present invention relates to three dimensional (3D) broadcasting, and more particularly to a method for processing a 3D video signal and a digital broadcast receiver for performing the processing method.

BACKGROUND ART

Generally, a three dimensional (3D) image (or a stereoscopic image) provides user's eyes with a stereoscopic effect using the stereoscopic visual principle. A human being senses depth through a binocular parallax caused by a distance between their eyes spaced apart from each other by about 65 mm, such that the 3D image enables both right and left eyes to respectively view their associated planar images, and a human brain merges two different images with each other, resulting in a sense of depth and a sense of presence in the 3D image.

For example, the above-mentioned 3D image display method may be classified into a stereoscopic scheme, a volumetric scheme, a holographic scheme, etc. In addition, a 3D image display device adds depth information to two dimensional (2D) images or uses left view image information and right view image information, such that a user of the 3D image display device can feel a sense of vividness and a sense of reality in a 3D image.

In addition, a method for allowing the user to view the 3D image may be exemplarily classified into one method for providing the user with polarization glasses and another method where the user is not provided with polarization glasses.

A television according to the related art has been designed to display only a 2D image. In contrast, many developers and companies have recently conducted intensive research into a 3D imaging technology for use in digital broadcasting. However, detailed protocols related to a 3D broadcast signal processing technology have not been defined yet, so that broadcast content providers, broadcast stations, and DTV manufacturers have been thrown into a great confusion with regard to such 3D broadcast signal processing.

DISCLOSURE

Technical Problem

Accordingly, the present invention is directed to a method for processing a three dimensional (3D) video signal and a digital broadcast receiver for performing the processing method, that substantially obviate one or more problems due to limitations and disadvantages of the related art.

An object of the present invention is to provide a new protocol capable of processing a 3D broadcast signal.

Another object of the present invention is to provide a method for more effectively transmitting signaling information needed for a 3 Dimensional TeleVision (3DTV) broadcast service.

A further object of the present invention is to provide a method for implementing a 3DTV broadcast service regardless of whether or not a broadcast station transmits camera parameter information.

Technical Solution

To achieve these objects and other advantages and in accordance with the purpose of the invention, as embodied and broadly described herein, a method for receiving a three dimensional (3D) broadcast signal includes receiving signaling information of at least one stream for a 3 Dimension TeleVision (3DTV) service and a two dimensional (2D) video stream, demultiplexing at least one stream for the 3DTV service and the 2D video stream based on the signaling information, decoding at least one demultiplexed stream for the 3DTV service and the demultiplexed 2D video stream, and outputting a 3D video signal by formatting at least one decoded stream for the 3DTV service and the decoded 2D video stream.

In another aspect of the present invention, provided herein is a method for transmitting a three dimensional (3D) broadcast signal includes acquiring multiple video information captured by at least two cameras, formatting a two dimensional (2D) video stream extracted from the acquired multiple video information and signaling information of at least one stream for a 3 Dimension TeleVision (3DTV) service, encoding the formatted 2D video stream and the formatted signaling information of at least one stream for the 3DTV service, and transmitting the encoded 2D video stream and the encoded signaling information of at least one stream for the 3DTV service.

It is to be understood that both the foregoing general description and the following detailed description of the present invention are exemplary and explanatory and are intended to provide further explanation of the invention as claimed.

Advantageous Effects

One embodiment of the present invention provides a new protocol capable of processing a 3D broadcast signal.

Another embodiment of the present invention provides a method for more effectively transmitting signaling information needed for a 3DTV broadcast service.

Another embodiment of the present invention provides a method for implementing a 3DTV broadcast service regardless of whether or not a broadcast station transmits camera parameter information.

DESCRIPTION OF DRAWINGS

The accompanying drawings, which are included to provide a further understanding of the invention, illustrate embodiments of the invention and together with the description serve to explain the principle of the invention.

In the drawings:

FIG. 2 shows a Virtual Channel Table (VCT) according to one embodiment of the present invention.

FIG. 3 shows a service type field including an added value from among fields of the VCT shown in FIG. 2 according to one embodiment of the present invention.

FIG. 4 shows a 3D service location descriptor added to the VCT shown in FIG. 2 according to one embodiment of the present invention.

FIG. 5 shows a Program Map Table (PMT) according to one embodiment of the present invention.

FIG. 6 shows a 3D service location descriptor added to the PMT shown in FIG. 5 according to one embodiment of the present invention.

BEST MODE

Figure 1:
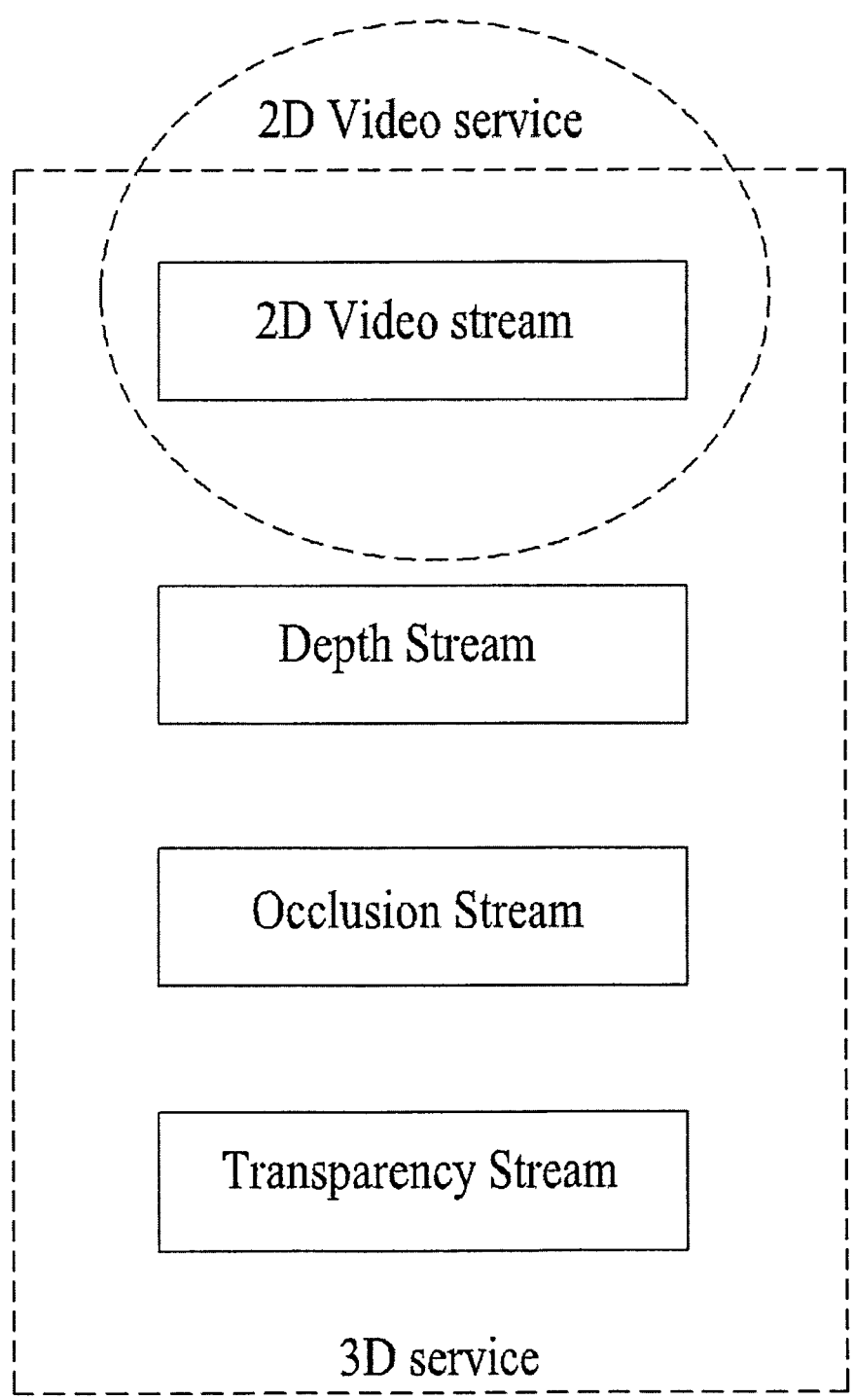
FIG. 1 is a structural diagram illustrating a plurality of streams for the 3DTV service according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Prior to describing the present invention, it should be noted that most terms disclosed in the present invention are defined in consideration of functions of the present invention and correspond to general terms well known in the art, and can be differently determined according to intention of those skilled in the art, usual practices, or introduction of new technologies. In some cases, a few terms have been selected by the applicant as necessary and will hereinafter be disclosed in the following description of the present invention. Therefore, it is preferable that the terms defined by the applicant be understood on the basis of their meanings in the present invention.

In accordance with the following embodiments of the present invention, information capable of processing a 3D video signal is contained in system information. The system information may also be called service information. For example, the system information includes channel information, program information, event information, etc. In accordance with the embodiments of the present invention, the system information may be newly added to a Program Specific Information/Program and System Information Protocol (PSI/PSIP) as necessary. However, the scope and spirit of the present invention are not limited to the above-mentioned examples. If it is assumed that there is a protocol capable of transmitting the system information in table format, the scope and spirit of the present invention can also be applied to other examples irrespective of titles of the system information.

The PSI is disclosed only for illustrative purposes and better understanding of the present invention. The PSI may include a Program Association Table (PAT), a Conditional Access Table (CAT), a Program Map Table (PMT), a Network Information Table (NIT), etc.

The PAT corresponds to specific information which is transmitted by a packet having a PID of '0'. The PAT transmits PID information of the PMT and PID information of the NIT of each program. The CAT transmits information of a pay broadcast service used in the broadcast transmission system. The PMT transmits a program identification number, packet identifier (PID) information of a transport stream packet, in which individual bit streams of video and audio data constituting a program are transmitted, and PID information, in which a PCR (Program Clock Reference) is transmitted. The NIT transmits information of an actual transmission network. For example, PID information of a program number and the PMT may be acquired by parsing the PAT having a PID of '0'. In addition, in the case where the PMT acquired from the PAT is parsed, information about correlation among constituent elements of a program is acquired.

The PSIP may include, for example, a Virtual Channel Table (VCT), a System Time Table (STT), a Rating Region Table (RRT), an Extended Text Table (ETT), a Direct Channel Change Table (DCCT), a Direct Channel Change Selection Code Table (DCCSCT), an Event Information Table (EIT), a Master Guide Table (MGT), and the like.

The VCT transmits information about a virtual channel, for example, channel information for selecting a channel and information about a packet identifier (PID) for receiving audio and/or video data. That is, when the VCT is parsed, a channel name, a channel number, and the PID of the audio and video data of a broadcast program carried in the channel can be known. The SIT transmits current date and time information, and the RRT transmits information about a region and an organ of consultation for a program rating level. The ETT transmits an additional description about a channel and a broadcast program, and the EIT transmits information about an event of a virtual channel. The DCCT/DCCSCT transmits information about an automatic channel change, and the MGT transmits version- and PID-information of individual tables contained in the PSIP.

The related art has provided only the 2 Dimension (2D) broadcast service such that it has not defined detailed signaling information needed for implementing the 3DTV service.

Therefore, one embodiment of the present invention provides signaling information needed for the 3DTV service, defines a procedure for transmitting, receiving, and processing the defined information, and a detailed description thereof will hereinafter be described in detail.

FIG. 1 is a structural diagram illustrating a plurality of streams for the 3DTV service according to one embodiment of the present invention. As shown in FIG. 1, in order to provide the 3DTV service, a 2D video stream, a depth stream, an occlusion stream, a transparency stream, etc. may be needed. However, the occlusion stream, the transparency stream, etc. may be optionally used. A method for defining signaling information for the above-mentioned streams will hereinafter be described with reference to the drawings from FIG. 2.

FIG. 2 shows a Virtual Channel Table (VCT) according to one embodiment of the present invention. FIG. 3 shows a service type field including an added value from among fields of the VCT shown in FIG. 2 according to one embodiment of the present invention.

A brief description of fields shown in FIG. 2 is as follows.

A value of a 'table_id' field indicates the type of a table section being defined here. For a 'terrestrial_virtual_channel_table_section( )' field, the 'table_id' field shall be set to '0xC8'.

A 'section_syntax_indicator' field is a one-bit field which shall be set to '1' for the 'terrestrial_virtual_channel_table_section( )' field.

A 'private_indicator' field shall be set to

A 'section_length' field is a 12-bit field in which the first two bits shall be set to '00'. It specifies the number of bytes of the section, starting immediately following the 'section_length' field, and including the CRC. The value in this field shall not exceed '1021'.

A 'transport_stream_id' field indicates the 16-bit MPEG-2 Transport Stream (TS) ID, as it appears in the Program Association Table (PAT) identified by a PID value of zero for this multiplex. The 'transport_stream_id' field distinguishes a Terrestrial Virtual Channel Table (TVCT) from others that may be broadcast in different PTCs (Physical Transmission Channels).

A 'version_number' field is a version number of the Virtual Channel Table (VCT). For the current VCT (current_next_indicator='1'), the version number shall be incremented by 1 whenever the definition of the current VCT changes. Upon reaching the value of 31, it wraps around to zero '0'. For the next VCT (current_next_indicator='0'), the version number shall be one unit more than that of the current VCT (also in modulo 32 arithmetic). In any case, the value of the 'version_number' field shall be identical to that of the corresponding entries in a Master Guide Table (MGT).

A 'current_next_indicator' field is a one-bit indicator. In the case where the 'current_next_indicator' field is set to '1', this means that a transmitted Virtual Channel Table (VCT) is currently applicable. When a bit of the 'current_next_indicator' field is set to '0', this means that the transmitted table is not yet applicable and shall be the next table to become valid. This standard imposes no requirement that 'next' tables (those with the 'current_next_indicator' field set to '0') must be sent. An update to the currently applicable table shall be signaled by incrementing the 'version_number' field.

A 'section_number' field gives the number of this section. The 'section_number' field of the first section in the Terrestrial Virtual Channel Table (TVCT) shall be set to '0x00'. It shall be incremented by one with each additional section in the Terrestrial Virtual Channel Table (TCVT).

A 'last_section_number' field specifies the number of the last section (that is, the section with the highest section_number value) of the complete Terrestrial Virtual Channel Table.

A 'protocol_version' field is used to allow, in the future, the table type to carry parameters that may be structured differently than those defined in the current protocol. At present, only one value valid for the 'protocol_version' field is zero. Non-zero values of the 'protocol_version' field may be used by a future version of this standard to indicate structurally different tables.

A 'num_channels_in_section' field specifies the number of virtual channels in this VCT section. The number is limited by the section_length.

A 'short_name' field specifies the name of the virtual channel.

A 'major_channel_number' field indicates a 10-bit number that represents the 'major' channel number associated with the virtual channel being defined in this iteration of the 'for' loop. Each virtual channel shall be associated with a major channel number and a minor channel number. Not only the major channel number but also the minor channel number acts as a user's reference number for the virtual channel. The 'major_channel_number' field shall be present between '1' and '99'. The value of 'major_channel_number' field shall be set such that there is no case in which a 'major_channel_number/minor_channel_number' pair is duplicated within the TVCT.

A 'minor_channel_number' field indicates a 10-bit number in the range from '0' to '999' so as to represent the 'minor' or 'sub' channel number. This 'minor_channel_number' field together with the 'major_channel_number' field may indicate a two-part channel number, where the 'minor_channel_number' field represents the second or right-hand part of the number. When the 'service_type' field is used to indicate an analog television, the 'minor_channel_number' field shall be set to zero '0'. Each service, a 'service_type' field, a value of which is either 'ATSC_digital_television' or 'ATSC_audio_only', shall use any of minor numbers ranging from 1 to 99. The value of the 'minor_channel_number' field shall be set such that there is no case in which a 'major_channel_number/minor_channel_number' pair is duplicated within the TVCT. For other types of services, such as data broadcasting, valid minor virtual channel numbers are in the range from '1' to '999'.

A 'modulation_mode' field indicates a modulation mode for the transmitted carrier associated with the virtual channel.

A 'carrier_frequency' field is set to a value of zero. The 'carrier_frequency' field may be used to identify a carrier_frequency, but the use of the 'carrier_frequency' field is deprecated.

A 'channel_TSID' field in the range from 0x0000 to 0xFFFF represents an MPEG-2 Transport Stream (TS) ID associated with the Transport Stream (TS) carrying the MPEG-2 program referenced by the virtual channel. For inactive channels, the 'channel_TSID' field shall represent an ID of the Transport Stream (TS) that will carry the service when it becomes active. It is expected that the receiver uses the 'channel_TSID' field to verify that any received Transport Stream (TS) is actually equal to the desired multiplex. For analog channels (service_type 0x01), the 'channel_TSID' field shall indicate a value of the analog TSID included in a VBI of an NTSC signal.

A 'program_number' field may associate the virtual channel being defined here with the MPEG-2 program association and TS program map tables.

For virtual channels representing analog services, a value of 0xFFFF shall be specified for a 'program_number' field.

An 'ETM_location' field specifies the existence and the location of an Extended Text Message (ETM).

An 'access_controlled' field indicates a 1-bit Boolean flag. When the Boolean flag of the 'access_controlled' field is set, this means that accessing the events associated with a virtual channel may be controlled. When the Boolean flag is set to '0', event access is not restricted.

A 'hidden' field indicates a 1-bit Boolean flag. When the Boolean flag of the 'hidden' field is set, this means that the virtual channel is not accessed by a user by a direct entry of the virtual channel number. Hidden virtual channels are skipped when the user is channel-surfing, and appear as if undefined, if accessed by direct channel entry. Typical applications for hidden channels are test signals and NVOD services. Whether a hidden channel and its events may appear in EPG displays depends on the state of the 'hide_guide' bit.

A 'hide_guide' field indicates a Boolean flag. When the Boolean flag of the hide_guide' field is set to zero '0' for a hidden channel, this means that the virtual channel and its events may appear in EPG displays. This bit shall be ignored for channels which do not have the hidden bit set, so that non-hidden channels and their events may always be included in EPG displays regardless of the state of the 'hide_guide' bit. Typical applications for hidden channels with the 'hide_guide' bit set to '1' are test signals and services accessible through application-level pointers.

A 'service_type' field shall identify the type of service carried in the virtual channel. Specifically, as shown in FIG. 3, if the 'service_type' field is set to 0x10, this means that a virtual channel carries 3D television programming. Needless to say, the above-mentioned value of 0x10 is disclosed only for illustrative purposes, and it is obvious to those skilled in the art that the scope and spirit of the present invention are not limited only to the above-mentioned value but are applicable to other examples as necessary.

A 'source_id_field' identifies the programming source associated with the virtual channel. In this context, a source is one specific source of video, text, data, or audio programming. A source ID value of zero is reserved. Source ID values in the range from 0x0001 to 0x0FFF shall be unique within the Transport Stream (TS) that carries the VCT, while values 0x1000 to 0xFFFF shall be unique at the regional level. Values for source ids 0x1000 and above shall be issued and administered by a Registration Authority (RA) designated by the ATSC.

A 'CRC_32' field contains a CRC value that ensures a zero output from the registers in the decoder.

Moreover, if the 'service_type' field has a value corresponding to the 3DTV service, the descriptor shown in FIG. 2 may newly define depth information, occlusion information, and transparency information needed for constructing the 3DTV service. A detailed description of the depth information, the occlusion information, and the transparency information will hereinafter be described with reference to FIG. 4.

FIG. 4 shows a 3D service location descriptor added to the VCT shown in FIG. 2 according to one embodiment of the present invention. The descriptor shown in FIG. 4 is present in the VCT shown in FIG. 2, and performs signaling of information of 3D components constructing a corresponding virtual channel. Detailed descriptions of individual fields are as follows.

A 'PCR_PID' field is a 13-bit field indicating the PID of Transport Stream (TS) packets which shall contain a PCR field valid for a program specified by a 'program_number' field.

A 'number_elements' field indicates the number of elements corresponding to the VCT. For example, the aforementioned elements may indicate elements for 3DTV services.

A 'data_type' field indicates whether the above-mentioned elements are associated with depth data, occlusion data, or transparency data.

An 'elementary_PID' field is a 13-bit field specifying the PID of Transport Stream (TS) packets which carry an associated program element.

A 'codec_type' field identifies the encoding type of the above-mentioned elements. For example, the encoding type may be the MPEG-2 video, the H.264/Advanced Video Coding (AVC) video, or the like.

In accordance with the 'bit_depth_minus_1' field, if the value of 1 is added to the 'bit_depth_minus_1' field, this added result means the number of bits used for representing each pixel. For example, the number of bits may be set to 8, 10, or the like, so that the bits may be 8-bits, 10-bits, or the like.

A 'same_resolution_flag' field indicates whether or not the resolution of each element associated with the 3DTV service is identical to the resolution of the 2D video. If the resolution of each element associated with the 3DTV service is different from the resolution of the 2D video, the 'same_resolution_flag' field indicates a horizontal size and a vertical size of the resolution using the 'horizontal_size' field and the 'vertical_size' field.

The above-mentioned embodiment of the present invention will hereinafter be described in detail.

The digital broadcast receiver according to one embodiment of the present invention receives not only signaling information of one or more streams for the 3DTV service but also a 2D video stream. Based on the signaling information, the digital broadcast receiver may demultiplex one or more streams for the 3DTV service and the 2D video stream.

The digital broadcast receiver decodes at least one demultiplexed stream for the 3DTV service and the demultiplexed 2D video stream, respectively. The digital broadcast receiver formats at least one decoded stream for the 3DTV service and the decoded 2D video stream, such that it outputs 3D video data.

As described above, for example, the signaling information may be defined in a descriptor of the VCT shown in FIG. 2, and the descriptor may be a syntax shown in FIG. 4. In accordance with another embodiment of the present invention, for example, the signaling information may be defined in the descriptor of the PMT shown in FIG. 5 to be described later, and the descriptor may be a syntax shown in FIG. 6 to be described later.

The signaling information may include a first field (e.g., the 'data_type' field of FIG. 4) for identifying at least one of depth information, occlusion information, and transparency information and a second field (e.g., the 'codec_type' field of FIG. 4) for identifying a coding type of the depth information, the occlusion information, or the transparency information.

The signaling information may further include a third field (e.g., the 'same resolution flag' field shown in FIG. 4) for identifying whether the resolution size of at least one stream for the 3DTV service is equal to that of the 2D video stream.

A detailed description of the above-mentioned embodiment of the present invention is as follows.

The broadcast receiver determines whether the 3DTV service is provided over a corresponding virtual channel using the 'service_type' field contained in the VCT shown in FIG. 2. If the 3DTV service is provided over the corresponding virtual channel, the broadcast receiver detects elementary_PID information of the 2D video stream using the service location descriptor. The PID of the 2D video stream may be called 'PID_V'.

The broadcast receiver determines which one of depth information, occlusion information, and transparency information is associated with a corresponding elementary stream using the 3D service location descriptor ('3D_service_location_descriptor' field) shown in FIG. 4. Subsequently, the broadcast receiver acquires elementary_PID for the corresponding elementary stream. The PID of the depth-associated stream may be called 'PID_D', the PID of the occlusion-associated stream may be called 'PID_O', and the PID of the transparency-associated stream may be called 'PID_T'. Needless to say, the above three streams may be partially or fully received at the broadcast receiver. Availability information indicating which one of streams is available may be determined using the 'data_type' field.

The broadcast receiver determines coding information and bit information using the 'codec_type' field and the 'bit_depth_minus_1' field contained in the 3D service location descriptor (the '3D_service_location_descriptor' field) shown in FIG. 4.

The broadcast receiver transmits a stream corresponding to PID_V to a video decoder by demultiplexing the received streams, and the video decoder decodes the received streams.

The broadcast receiver transmits streams corresponding to PID_D, PID_O, and PID_T to a first decoder for processing depth information, a second decoder for processing occlusion information, and a third decoder for processing transparency information, respectively. The first decoder, the second decoder, and the third decoder may be integrated into one 3D metadata decoder such that each or all of the decoders may be called the 3D metadata decoder.

Finally, the broadcast receiver simultaneously processes the 2D video stream and at least one stream (e.g., depth, occlusion, transparency, and the like) for the 3DTV service corresponding to the 2D video stream, so that it may make a rendering or format 3D video data.

FIG. 5 shows a Program Map Table (PMT) according to one embodiment of the present invention.

A brief description of fields shown in FIG. 5 is as follows.

A 'table_id' field is an 8-bit field which shall always be set to '0x02' in a 'TS_program_map_section' field.

A 'section_syntax_indicator' field is a 1-bit field which shall be set to '1'.

A 'section_length' field is a 12-bit field in which first two bits shall be set to '00'. The remaining 10 bits may specify the number of bytes of the section starting immediately following the 'section_length' field, and including the CRC. The value in this field shall not exceed '1021' (0x3FD).

A 'program_number' field is a 16-bit field. It specifies the program to which the 'program_map_PID' field is applicable. One program definition shall be carried within only one 'TS_program_map_section' field. This implies that a program definition is never longer than '1016' (0x3F8). For example, the 'program_number' field may be used as a designation for a broadcast channel. By describing the different program elements belonging to a program, data from different sources (e.g. sequential events) can be concatenated together to form a continuous set of streams using a 'program_number' field.

A 'version_number' field is the version number of the 'TS_program_map_section' field. The version number shall be incremented by 1 modulo 32 when a change in the information carried within the section occurs. The version number refers to the definition of a single program, and therefore to a single section. When the 'current_next_indicator' field is set to '1', then the 'version_number' field shall be that of the currently applicable 'TS_program_map_section' field. When the 'current_next_indicator' field is set to '0', then the 'version_number' field shall be that of the next applicable 'TS_program_map_section' field.

A 'current_next_indicator' field may be set to '1', which indicates that the transmitted 'TS_program_map_section' field is currently applicable. When a bit of the 'current_next_indicator' field is set to '0', the bit of '0' indicates that the transmitted 'TS_program_map_section' field is not yet applicable and shall be the next 'TS_program_map_section' field to become valid.

The value of the 'section_number' field shall be '0x00'.

The value of the 'last_section_number' field shall be '0x00'.

A 'PCR_PID' field is a 13-bit field indicating the PID of the Transport Stream (TS) packets which shall contain the PCR fields valid for the program specified by a 'program_number' field. In the case where no PCR is associated with a program definition for private streams, then this field shall take the value of '0x1FFF'.

A 'program_info_length' field is a 12-bit field, the first two bits of which shall be '00'. The remaining 10 bits may specify the number of bytes of descriptors immediately following the 'program_info_length' field.

A 'stream_type' field is an 8-bit field specifying the type of a program element carried within packets with the PID whose value is specified by the 'elementary_PID' field.

An 'elementary_PID' field is a 13-bit field specifying a PID of the Transport Stream (TS) packets which carry the associated program element.

An 'ES_info_length' field is a 12-bit field, the first two bits of which shall be '00'. The remaining 10 bits may specify the number of bytes of descriptors of the associated program element immediately following the 'ES_info_length' field.

A 'CRC_32' field is a 32-bit field which contains a CRC value that gives a zero output of registers in the decoder.

In addition, the 'stream_type' field of the PMT shown in FIG. 5 may be used for the same purpose as that of the 'data_type' field shown in FIG. 4. The descriptor shown in FIG. 5 may be located under the 'ES_info_length' field, and include information of the elementary stream for the 3DTV service. The descriptor shown in FIG. 5 may be designed in the form of the 3D service location descriptor shown in FIG. 6, and functions of fields shown in FIG. 6 may be identical to those of fields shown in FIG. 4. Accordingly, in accordance with the present invention, it is possible to insert the signaling information for the 3DTV service into each of the VCT and the PMT. FIG. 6 shows a 3D service location descriptor added to the PMT shown in FIG. 5 according to one embodiment of the present invention.

Another embodiment of the present invention will hereinafter be described in detail.

The broadcast receiver determines which one of depth information, occlusion information, and transparency information is associated with a corresponding element stream using the 'stream_type' field of the PMT shown in FIG. 5. Subsequently, the broadcast receiver acquires elementary_PID for the corresponding elementary stream. The PID of the depth-associated stream may be called 'PID_D', the PID of the occlusion-associated stream may be called 'PID_O', and the PID of the transparency-associated stream may be called 'PID_T'. Needless to say, the above three streams may be partially or fully received at the broadcast receiver. Availability information indicating which one of streams is available may be determined using the 'stream_type' field.

The broadcast receiver determines coding information and bit information using the 'codec_type' field and the 'bit_depth_minus_1' field contained in the 3D service location descriptor (the '3D_service_location_descriptor' field) shown in FIG. 6.

The broadcast receiver maps received information to information provided from the VCT using the program number ('program_number') field shown in FIG. 5. As a result, the broadcast receiver determines which one of virtual channels is provided for a 3DTV service.

The broadcast receiver transmits a stream corresponding to PID_V (i.e., PID corresponding to the 2D video stream) to a video decoder by demultiplexing the received streams, and the video decoder decodes the received streams.

The broadcast receiver transmits streams corresponding to PID_D, PID_O, and PID_T to a first decoder for processing depth information, a second decoder for processing occlusion information, and a third decoder for processing transparency information, respectively. The first decoder, the second decoder, and the third decoder may be integrated into one 3D metadata decoder such that each or all of the decoders may be called only the 3D metadata decoder.

Finally, the broadcast receiver simultaneously processes the 2D video stream and at least one stream (e.g., depth, occlusion, transparency, and the like) for the 3DTV service corresponding to the 2D video stream, so that it may make a rendering or format 3D video data.

Figure 7:
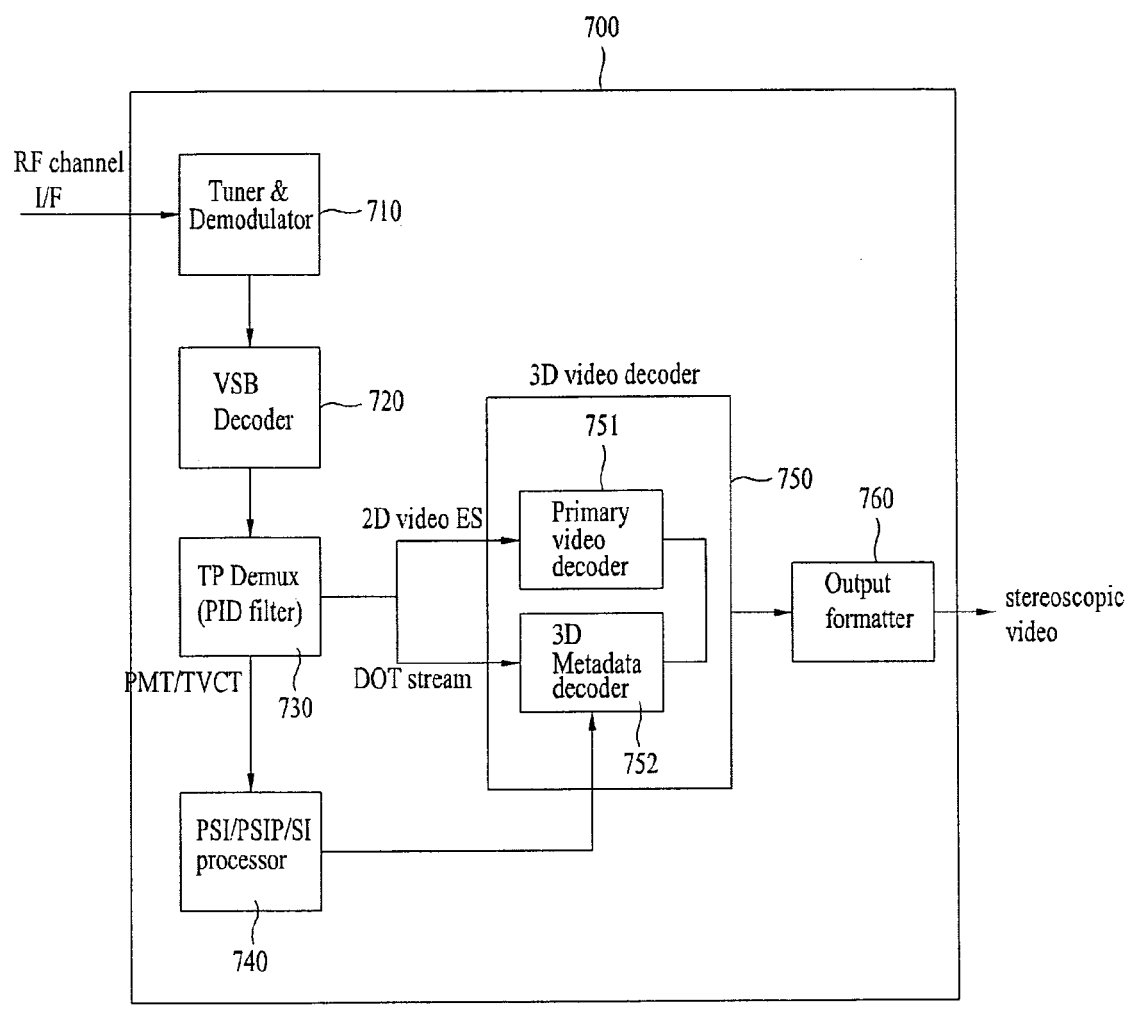
FIG. 7 is a block diagram illustrating constituent elements of a digital broadcast receiver for processing a 3D broadcast signal including a 3D service location descriptor according to one embodiment of the present invention.

FIG. 7 is a block diagram illustrating constituent elements of a digital broadcast receiver for processing a 3D broadcast signal including a 3D service location descriptor according to one embodiment of the present invention.

Referring to FIG. 7, the digital broadcast receiver 700 according to one embodiment of the present invention includes a tuner & demodulator 710, a Vestigial Side Band (VSB) decoder 720, a TP demultiplexer 730, a PSI/PSIP/SI processor 740, a 3D video decoder 750, an output formatter 760, and the like. The TP demultiplexer (TP Demux) 730 may also be functioned as a PID filter, and the 3D video decoder may include a primary video decoder 750 and a 3D metadata decoder 752.

The tuner & demodulator 710 may receive a digital broadcast signal from the digital broadcast transmitter, and demodulate the received broadcast signal. For example, the digital broadcast signal may include signaling information of at least one stream for the 3DTV service, a 2D video stream, and the like.

The VSB decoder 720 decodes the demodulated signal. The TP demultiplexer 730 transmits a 2D video stream to the primary video decoder 751, transmits one or more streams for the 3DTV service to the 3D metadata decoder 752, and transmits signaling information of one or more streams for the 3DTV service to the PSI/PSIP/SI processor 740 by using PID.

The primary video decoder 751 may decode the demultiplexed 2D video stream. The 3D metadata decoder 752 receives signaling information for the 3D service shown in FIG. 4 or 6 from the PSI/PSIP/SI processor 740, and decodes at least one demultiplexed stream (e.g., a depth stream, an occlusion stream, a transparency stream, a DOT stream, etc.) for the 3DTV service.

The output formatter 760 formats at least one decoded stream for the 3DTV service and the decoded 2D video stream, such that it outputs 3D video data. For example, the 3D video data may be stereoscopic video data.

Figure 8:
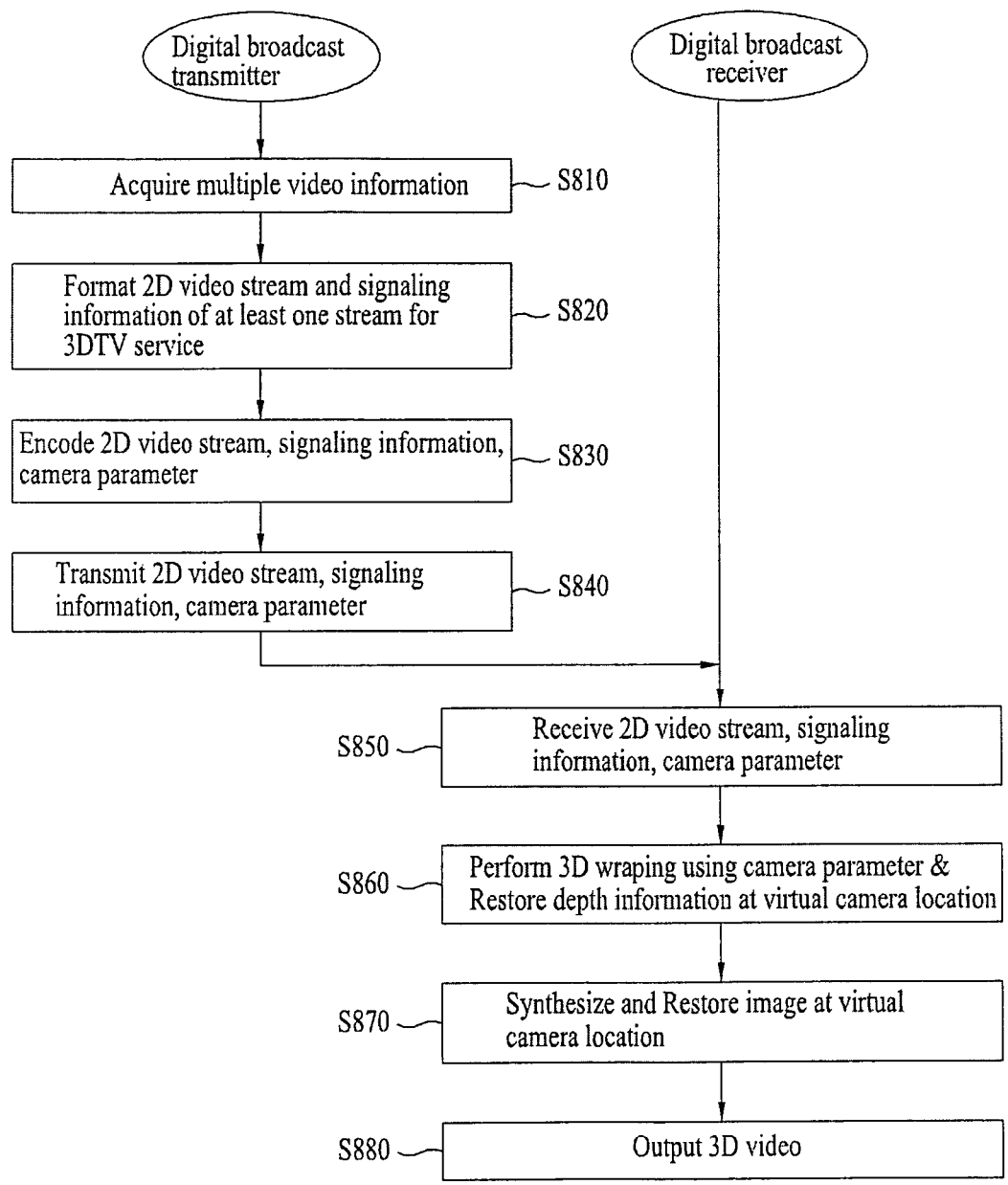
FIG. 8 is a flowchart illustrating a method for controlling a digital broadcast transmitter and a digital broadcast receiver for providing a 3DTV service when a digital broadcast transmitter transmits a camera parameter according to an embodiment of the present invention.

FIG. 8 is a flowchart illustrating a method for controlling a digital broadcast transmitter and a digital broadcast receiver for providing a 3DTV service when a digital broadcast transmitter transmits a camera parameter according to an embodiment of the present invention. A method for allowing a digital broadcast transmitter to transmit a video signal including a camera parameter and a method for allowing a digital broadcast receiver to generate and restore video data (or image data) on the basis of the camera parameter will hereinafter be described with reference to FIG. 8.

The digital broadcast transmitter captures video data using several cameras (e.g., a pair of stereoscopic cameras), and acquires multiple video information at step S810. At least one of several cameras may be a real camera, and each of the remaining cameras may be a virtual camera. In this case, the real camera may be a camera that transmits a stream of a captured image to a digital broadcast receiver. The virtual camera means a camera that transmits a camera parameter to the digital broadcast receiver, such that a video stream is not transmitted to the digital broadcast receiver and the digital broadcast receiver can restore the corresponding stream. The above-mentioned virtual camera may not be actually present, but the following camera parameter for the virtual camera may be optionally decided by a broadcast program producer or engineer.

In correspondence with each of real cameras, a camera (called a depth camera) for obtaining depth information (or range information) associated with each primary viewpoint contained in an image is arranged so that a digital broadcast receiver can simultaneously obtain the image (or video information) and the depth information. Moreover, the digital broadcast transmitter may extract additional information to be transmitted to the digital broadcast receiver from the image captured by the camera. The additional information may include specific information to estimate a blind part covered by a front object. For example, the specific information may include geometrical information such as an object outline, object transparency information, color information, etc. In accordance with the embodiment of the present invention, the additional information may be acquired from the real camera. However, in accordance with any modified embodiment, the additional information may be acquired from either an image captured by the virtual camera or a combination of an image captured by the real camera and an image captured by the virtual camera. Depth information and/or additional information may not be always needed, and the depth and/or additional information may be optionally extracted and transmitted when the digital broadcast receiver generates a virtual image.

At step S820, the digital broadcast transmitter formats not only a 2D video stream but also signaling information of at least one stream for the 3DTV service using multiple video information captured by the camera. In other words, the digital broadcast transmitter may multiplex a video signal in the form of the above image and a combination of depth information and additional information.

The digital broadcast transmitter encodes the formatted 2D video stream, signaling information of at least one stream for the 3DTV service, and a camera parameter at step S830. The digital broadcast transmitter transmits the encoded 2D video stream, the signaling information of at least one stream for the 3DTV service, and the camera parameter at step S840.

However, although Steps S820, S830 and S840 have been illustrated in FIG. 8 to process the 2D video stream, the signaling information, the camera parameter, etc., it can be that a depth stream, an occlusion stream, and a transparency stream corresponding to the signaling information may be additionally processed so that the processed result may be transmitted to the digital broadcast receiver.

If the digital broadcast receiver receives a 2D video stream, signaling information, and the camera parameter at step S850, the digital broadcast receiver recovers an image according to the 2D video stream and the signaling information. In accordance with another embodiment of the present invention, the depth stream, the occlusion stream, and the transparency stream corresponding to the signaling information may be additionally received at the digital broadcast receiver.

First, the digital broadcast receiver performs 3D warping using the camera parameter, and restores depth information at the location of the virtual camera at step S860. Subsequently, the digital broadcast receiver may synthesize and restore the image acquired at the virtual camera location according to the 3D format at step S870. The digital broadcast receiver outputs 3D video data at step S880. The 3D video data may be stereoscopic video data or the like.

Figure 9:
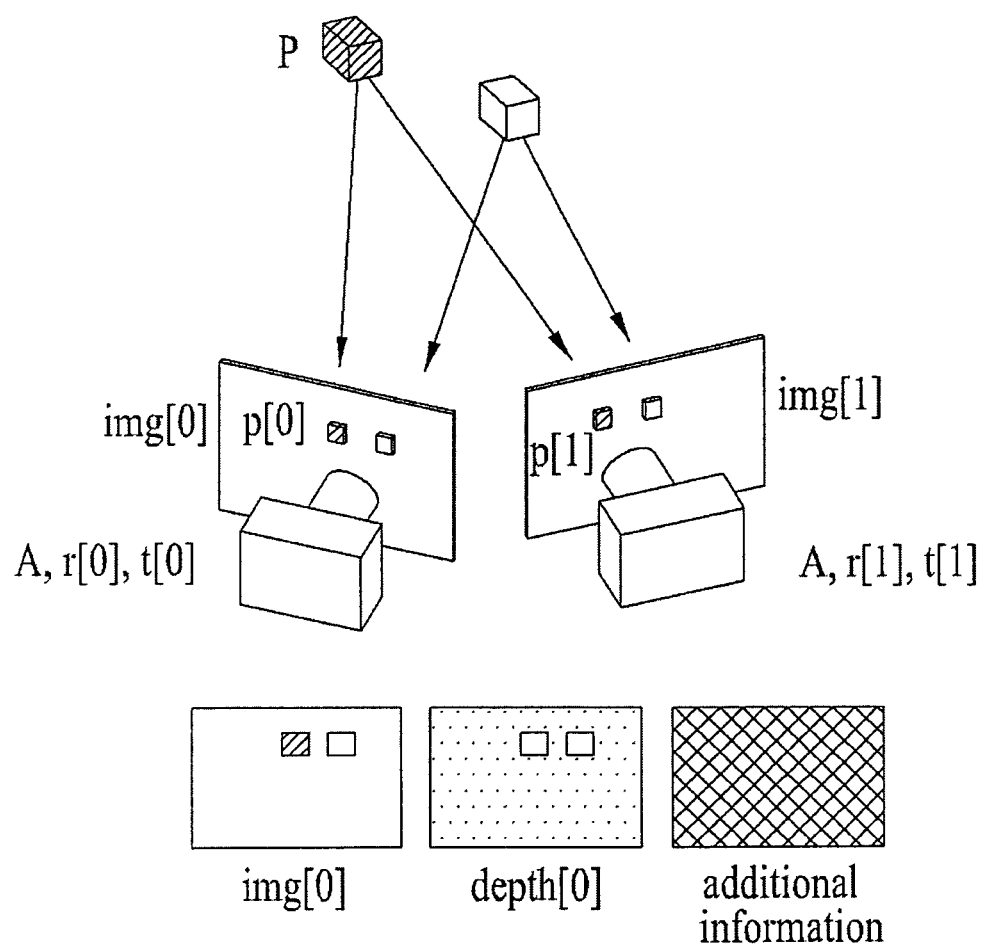
FIG. 9 is a conceptual diagram illustrating some parts of the digital broadcast transmitter operations shown in FIG. 8 according to an embodiment of the present invention.
Figure 10:
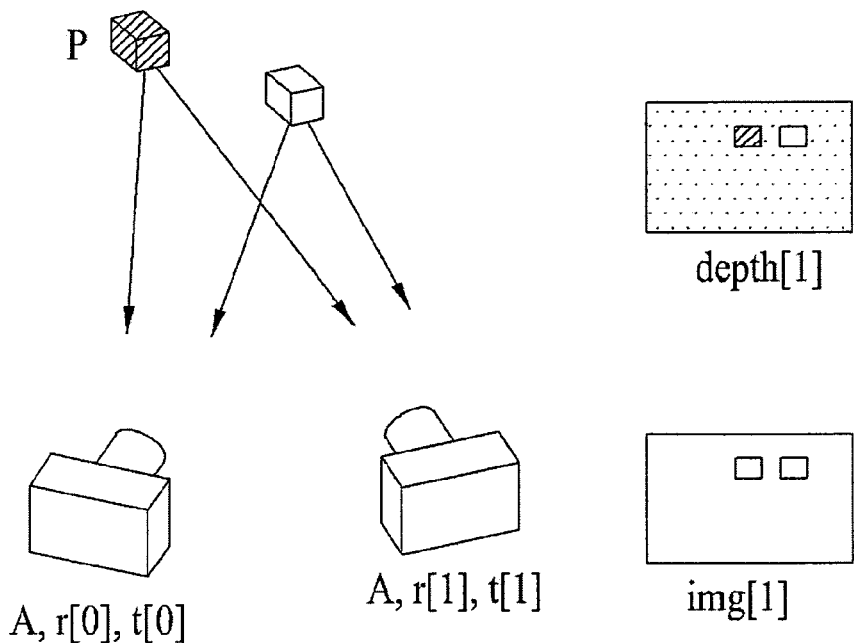
FIG. 10 is a conceptual diagram illustrating some parts of the digital broadcast receiver operations shown in FIG. 8 according to an embodiment of the present invention.

FIG. 9 is a conceptual diagram illustrating some parts of the digital broadcast transmitter operations shown in FIG. 8 according to an embodiment of the present invention. FIG. 10 is a conceptual diagram illustrating some parts of the digital broadcast receiver operations shown in FIG. 8 according to an embodiment of the present invention.

Referring to FIGS. 9 and 10, the digital broadcast transmitter may transmit the encoded video information, the encoded depth information, and the encoded additional information, and the digital broadcast receiver may decode the video information, the depth information, and the additional information, such that an objective image can be generated and restored, and as such a detailed description thereof will hereinafter be described in detail.

As can be seen from FIG. 9, for convenience of descriptor and better understanding of the present invention, one real camera and one virtual camera are shown in FIG. 9. However, the number of real cameras and the number of virtual cameras are disclosed only for illustrative purposes, and it is apparent to those skilled in the art that more real cameras and more virtual cameras may also be installed as necessary.

In FIG. 9, it is assumed that an image captured by the real camera is 'img[0]' and an image captured or capturable by the virtual camera is 'img[1]'. It is assumed that a point corresponding to the point P in a 3D real world on the image img[0] is denoted by p[0], and a point corresponding to the point P on the image img[1] is denoted by p[1]. The camera parameter may be classified into an intrinsic camera parameter and an extrinsic camera parameter. The intrinsic camera parameter may indicate optical characteristics of a camera lens, such as a focal length and a principal point, and unique characteristics of a camera, such as a skew factor. The extrinsic camera parameter may indicate geometrical-location and direction of the real camera or the virtual camera, and may include a translation and the amount of rotation, etc. of each reference coordinate system with respect to a reference coordinate system of the real world. In the example of FIG. 9, it is assumed that the intrinsic camera parameter of a first camera (i.e., the real camera) is denoted by 'A'. If it is assumed that a second camera (i.e., the virtual camera) is the same kind as the first camera and is sufficiently calibrated with the first camera, the intrinsic camera parameter of the second camera is also set to 'A' in the same manner as in the first camera. It is assumed that the amount of rotation of the first camera is denoted by r[0] and the translation of the first camera is denoted by t[0]. The amount of rotation of the second camera is denoted by r[1] and the translation of the second camera is denoted by t[1].

In accordance with the embodiment of the present invention, depth information and image information are transmitted to the digital broadcast receiver of each of all real cameras. In addition, the additional information is configured on the basis of one image, and is then transmitted to the digital broadcast receiver. Therefore, in the example of FIG. 9 including one real camera and one virtual camera, the image img[0] and depth information depth[0] of the first camera acting as the real camera are transmitted to the digital broadcast receiver. In addition, the additional information is further transmitted to the digital broadcast receiver so that the image img[1] and the depth information depth[1] of the second camera can be used in the digital broadcast receiver.

The digital broadcast receiver decodes the encoded video signal, and restores the image img[0], the depth information depth[0], and the additional information for the first camera acting as the real camera. In addition, the digital broadcast receiver restores camera parameters A, r[0], t[0], r[1], and t[1] for all cameras during the decoding process. Referring to FIG. 10, the digital broadcast receiver generates depth information 'depth[1]' at the location of the second camera using the camera parameters A, r[0], t[0], r[1], and t[1], the image img[0] and the depth information 'depth[0]' of the first camera, and the additional information. Subsequently, the digital broadcast receiver performs 3D warping so that the image img[1] of the location of the second virtual camera is generated. In this way, the image img[0] captured by the first camera and the image img[1] captured by the second camera are obtained, so that the digital broadcast receiver formats two images (i.e., the real image img[0] and the virtual image img[1]) so as to display the 3D image. For example, one of the real image and the virtual image is set to a left view image and the other one is set to a right view image, so that these images are stereoscopically displayed according to a 3D format.

In order to implement the 3DTV service, the additional viewpoint image must be obtained. Specifically, as shown in FIG. 8, a method for obtaining the additional viewpoint image while the camera parameter is transmitted will hereinafter be described.

One point (i.e., the point P) of a 3D space is mapped to p[0] in the 0-th camera, and is mapped to p[1] in the first camera. The relationship among p[i], s[i], A[i], r[i], and t[i] can be represented by the following equation 1 using the camera parameter transferred from the digital broadcast transmitter.

$$s[i]\begin{bmatrix}p[i]\\1\end{bmatrix} = A[i][\;r[i]\;\;t[i]\;]\begin{bmatrix}P\\1\end{bmatrix} \quad \text{[Equation 1]}$$

In Equation 1, s[i] is a scaling factor at the i-th camera, A[i] is an intrinsic parameter of the i-th camera, r[i] is a rotation value among extrinsic cameras of the i-th camera, and t[i] is a translation value among extrinsic parameters of the i-th camera.

With respect to the point mapped to the i-th camera, the equation for the point mapped to the 0-th camera can also be represented by the following equation 2.

$$z[i]p[i]=z[0]A[i]r[i]r[0]A[0]^{-1}p[0]-A[i]r[i]r[0]^{-1}t[0]+A[i]t[i] \quad \text{[Equation 2]}$$

In Equation 2, z is a depth value.

If the 3D warping, such as homographic transform, is performed on a corresponding depth map by means of the parameter of the 0-th camera having acquired 2D video data, the depth map of the i-th virtual camera can be obtained. Therefore, the depth value of Equation 2 can be obtained so that the image value p[i] mapped to the i-th camera can be calculated.

Equation 1 and Equation 2 can be represented by the following equations (a) and (b).

$$s[i]p[i]=A[i]r[i]P+A[i]t[i] \quad \text{[Equation (a)]}$$

$$s[0]p[0]=A[0]r[0]P+A[0]t[0] \quad \text{[Equation (b)]}$$

Equation [b] can be represented by the following equation (c).

$$A[0]r[0]P=s[0]p[0]-A[0]t[0] \quad \text{[Equation (c)]}$$

$$P=s[0]r[0]^{-1}A[0]^{-1}p[0]-r[0]^{-1}t[0]$$

If Equation (c) is substituted into Equation (a), the following equation (d) can be obtained.

$$s[i]p[i]=s[0]A[i]r[i]r[0]^{-1}A[0]^{-1}p[0]-A[i]r[i]r[0]^{-1}t[0]+A[i]t[i] \quad \text{[Equation (d)]}$$

In Equation (d), if s(i) is replaced with depth, 'z[i]', and p[i]$^{-1}$ is multiplied by each of both sides, the following equation (e) can be acquired.

$$s[i]=s[0]A[i]r[i]r[0]^{-1}A[0]^{-1}p[0]p[i]^{-1}- A[i]r[i]r[0]^{-1}t[0]p[i]^{-1}+A[i]t[i]p[i]^{-1}$$ [Equation (e)]

For example, the depth map is a depth image composed of 3D coordinates of each pixel corresponding to one 2D picture. Therefore, each coordinate values of the depth map corresponds to a depth value of the position (x,y) corresponding to the 2D picture. In other words, the depth value can mean a distance from a camera to an object.

In accordance with the application of the above-mentioned method, if the digital broadcast receiver establishes a predetermined virtual camera, i.e., if the digital broadcast receiver establishes a camera parameter, 3D video data (or 3D image) of a new viewpoint can be implemented.

Figure 11:
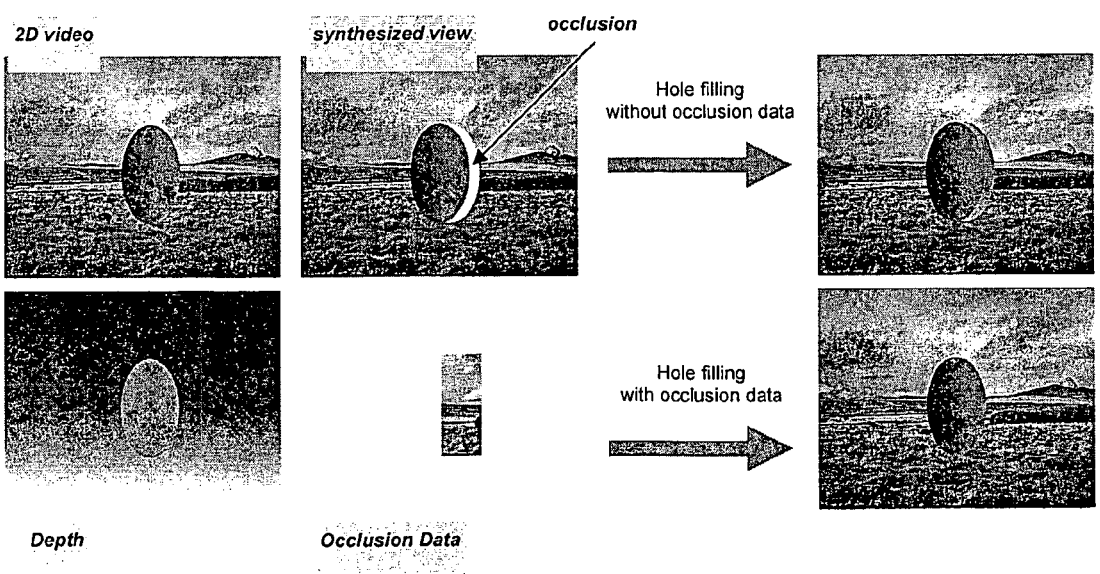
FIG. 11 shows one case having no occlusion data and the other case having occlusion data in a process for implementing a screen image of a 3DTV service according to one embodiment of the present invention.

FIG. 11 shows one case having no occlusion data and the other case having occlusion data in a process for implementing a screen image of a 3DTV service according to one embodiment of the present invention.

As described above, when a new viewpoint image is obtained so as to convert a 2D video signal into a 3D video signal using the depth information, a newly viewed part (i.e., the occlusion area) of the new viewpoint must be hole-filling processed with peripheral values (e.g., pixel values) in a subsequent process. For example, as shown in the upper part of FIG. 11, the hole-filling process may also be applied even to the case having no occlusion data.

However, in the case of transmitting the occlusion information over a transmission channel, a more perfect 3D image can be implemented even at the new viewpoint as shown in the lower part of FIG. 11. In addition, when transmitting transparency information over the transmission channel, a boundary between a background view and a panoramic view can also be more smoothly processed.

Figure 12:
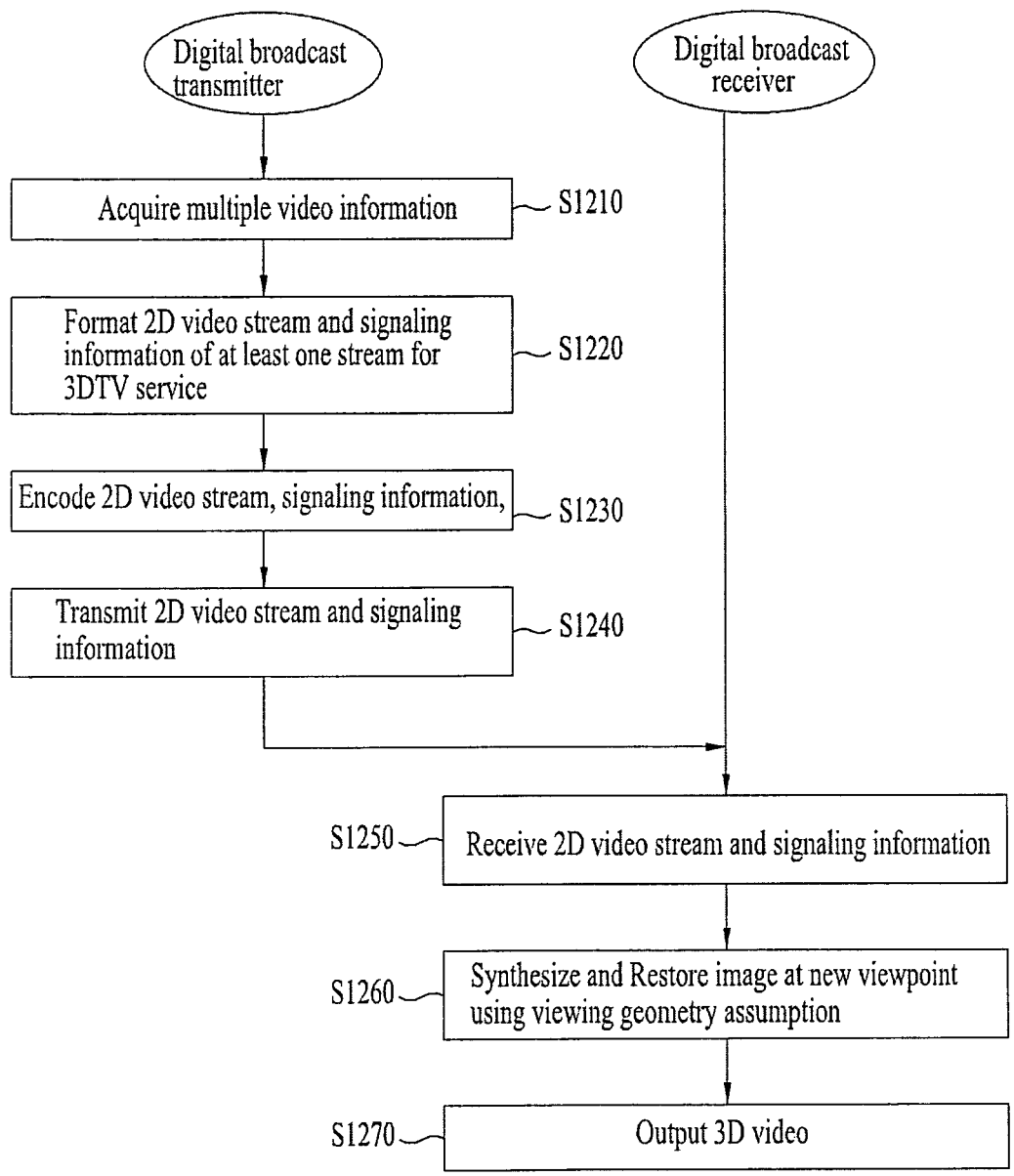
FIG. 12 is a flowchart illustrating a method for controlling a digital broadcast transmitter and a digital broadcast receiver for providing a 3DTV service when the digital broadcast transmitter transmits no camera parameter according to an embodiment of the present invention.

FIG. 12 is a flowchart illustrating a method for controlling a digital broadcast transmitter and a digital broadcast receiver for providing a 3DTV service when the digital broadcast transmitter transmits no camera parameter according to an embodiment of the present invention. A method for enabling a digital broadcast receiver to generate and restore an image on the condition that the digital broadcast transmitter transmits a video signal having no camera parameter will hereinafter be described with reference to FIG. 12.

Referring to FIG. 12, the digital broadcast transmitter controls several cameras (e.g., a pair of stereoscopic cameras) to capture an image, so that it obtains multiple video information at step S1210. At least one of several cameras is a real camera and each of the remaining cameras is a virtual camera. However, the process shown in FIG. 12 may also be interpreted by referring to the method shown in FIG. 8.

At step S1220, the digital broadcast transmitter formats not only a 2D video stream but also signaling information of at least one stream for the 3DTV service using multiple video information captured by the cameras.

The digital broadcast transmitter encodes the formatted 2D video stream, signaling information of at least one stream for the 3DTV service, and a camera parameter at step S1230. The digital broadcast transmitter transmits the encoded 2D video stream and the signaling information of at least one stream for the 3DTV service at step S1240.

However, although Steps S1220, S1230 and S1240 have been illustrated in FIG. 12 to process the 2D video stream, the signaling information, etc., it can be that a depth stream, an occlusion stream, and a transparency stream corresponding to the signaling information may be additionally processed so that the processed result may be transmitted to the digital broadcast receiver.

If the digital broadcast receiver receives a 2D video stream and signaling information at step S1250, the digital broadcast receiver may recover an image according to the 2D video stream and the signaling information. In accordance with another embodiment of the present invention, the depth stream, the occlusion stream, and the transparency stream corresponding to the signaling information may also be additionally received at the digital broadcast receiver.

First, the digital broadcast receiver may synthesize and restore a new viewpoint image using the assumption of viewing geometry at step S1260, and a detailed description thereof will hereinafter be described with reference to FIG. 15. Furthermore, the digital broadcast receiver outputs 3D video data at step S1270. The 3D video data may be stereoscopic video data or the like.

Figure 13:
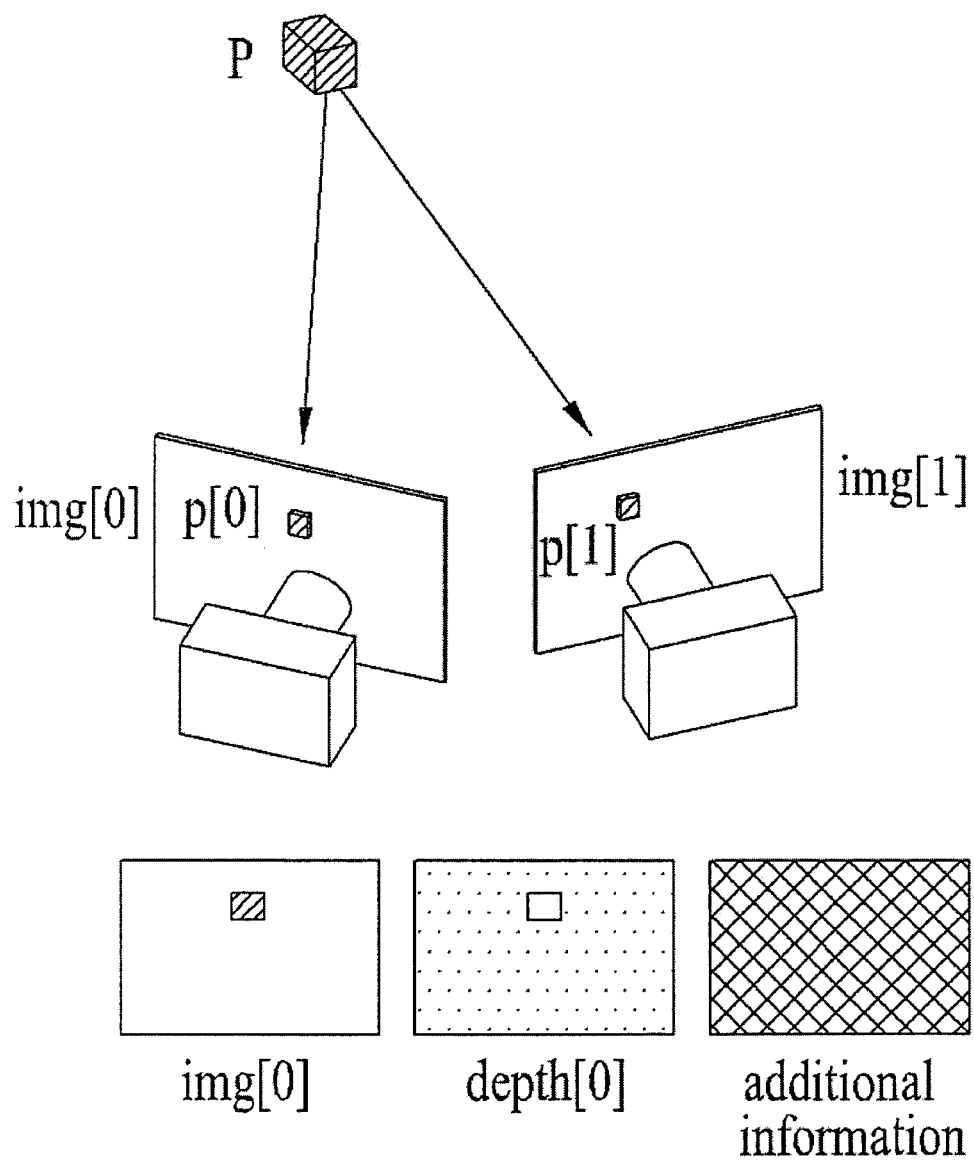
FIG. 13 is a conceptual diagram illustrating some operations of the digital broadcast transmitter shown in FIG. 12 according to an embodiment of the present invention.
Figure 14:
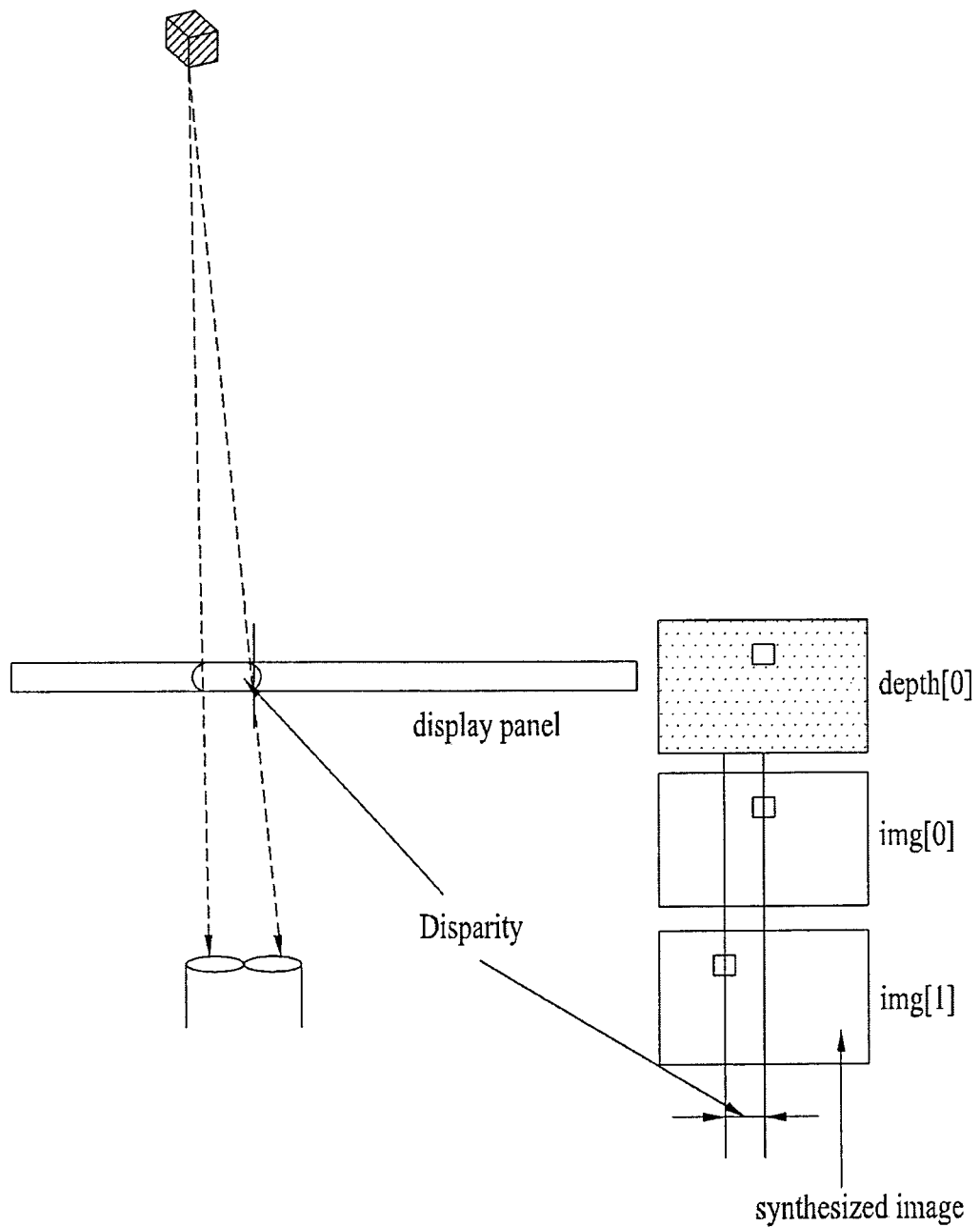
FIG. 14 is a conceptual diagram illustrating some operations of the digital broadcast receiver shown in FIG. 12 according to an embodiment of the present invention.

FIG. 13 is a conceptual diagram illustrating some operations of the digital broadcast transmitter shown in FIG. 12 according to an embodiment of the present invention. FIG. 14 is a conceptual diagram illustrating some operations of the digital broadcast receiver shown in FIG. 12 according to an embodiment of the present invention.

Referring to FIG. 13, if camera parameters (e.g., A, r, t, etc.) are not transmitted in a different way from FIG. 9, it is impossible to calculate a new viewpoint for synthesizing the 3D image using such camera parameters as shown in FIG. 10. In this case, as shown in FIG. 14 or 15, it is necessary to calculate the new viewpoint using the assumption of view geometry.

Figure 15:
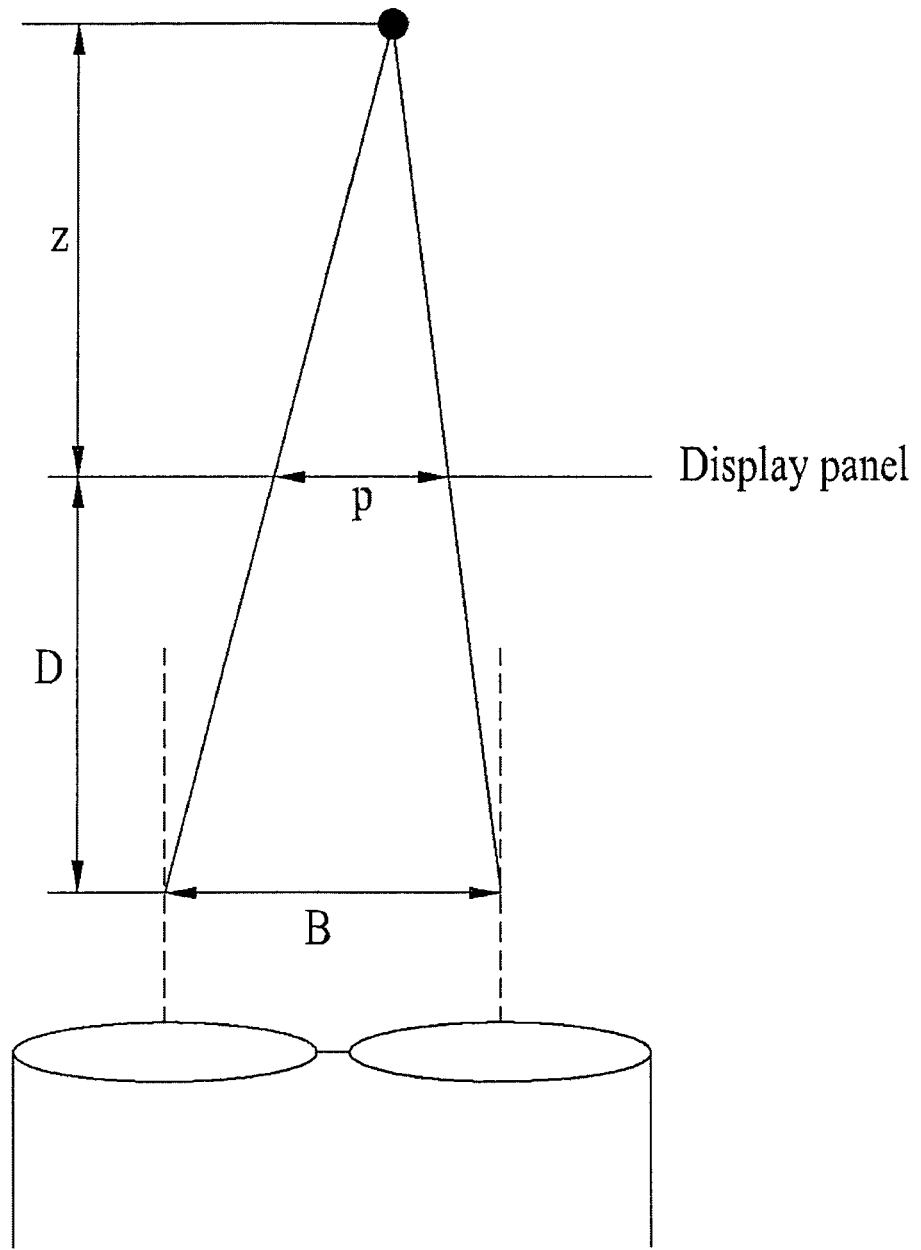
FIG. 15 is a conceptual diagram illustrating a method for acquiring an additional viewpoint image needed for a 3DTV service using an assumption of viewing geometry when the digital broadcast transmitter transmits no camera parameter.

FIG. 15 is a conceptual diagram illustrating a method for acquiring an additional viewpoint image needed for the 3DTV service using the assumption of viewing geometry when the digital broadcast transmitter transmits no camera parameter. In FIG. 15, B is a distance between right and left eyes, and D is a distance between a display panel and the human being. If a predetermined average value is substituted into each of the distance values, the disparity (p) can be calculated using the principle of trigonometry as shown in FIG. 15. The distance (z) indicating the distance from a new viewpoint to the display panel so as to implement the 3D image can be calculated using the depth map.

Therefore, in association with each pixel of the 2D video data, the distance (z) can be calculated on the basis of the depth value corresponding to each pixel of the depth map. In addition, the disparity (p) may be calculated by the following equation 3, and the pixel position can be shifted by the disparity (p). If the above-mentioned processes are carried out on all pixels of 2D video data, a new 3D synthesized image can be implemented.

$$\frac{z}{p} = \frac{z+D}{B} \Rightarrow p = \frac{Bz}{z+D}$$ [Equation 3]

As described above, when a new viewpoint image is obtained so as to convert a 2D video signal into a 3D video signal using the depth information, a newly viewed part (i.e., the occlusion area) of the new viewpoint must be hole-filling processed with peripheral values (e.g., pixel values) in a subsequent process.

However, in the case of transmitting the occlusion information over a transmission channel, a more perfect 3D image can be implemented even at the new viewpoint as shown in the lower part of FIG. 11. In addition, when transmitting transparency information over the transmission channel, a boundary between a background view and a panoramic view can also be more smoothly processed.

As described above, in accordance with one embodiment of the present invention, a process for transmitting signaling information for the 3DTV service, a process for receiving the signaling information, and a process for processing the signaling information are definitely defined, so that a conventional DTV can provide not only the 2D broadcast service but also the 3DTV service.

Moreover, in accordance with another embodiment of the present invention, although the signaling information and the camera parameter are transmitted or not transmitted, the 3DTV service can be implemented.

The method disclosed in the present invention may be implemented in the form of program commands executable by a variety of computer means, and recorded on a computer-readable recording medium. The computer-readable recording medium may include program commands, data files, data structures, etc. individually or in combination. The program commands recorded on the medium may be ones specially designed and configured for the present invention or ones known and available to those skilled in computer software. Examples of the computer-readable recording medium include magnetic media such as a hard disk, a floppy disk and a magnetic tape, optical media such as a compact disc read only memory (CD-ROM) and a digital versatile disc (DVD), magneto-optical media such as a floptical disk, and hardware devices specially configured to store and execute program commands, such as a ROM, a random access memory (RAM) and a flash memory. Examples of the program commands include high-level language codes that may be executed by a computer using an interpreter, etc., as well as machine language codes such as those produced by a compiler. The above-stated hardware devices may be configured to operate as one or more software modules to perform the operation of the present invention, and vice versa. Although the present invention has been described in conjunction with the limited embodiments and drawings, the present invention is not limited thereto. Those skilled in the art will appreciate that various modifications, additions and substitutions are possible from this description. Therefore, the scope of the present invention should not be limited to the description of the exemplary embodiments and should be determined by the appended claims and their equivalents.

MODE FOR INVENTION

Various embodiments have been described in the best mode for carrying out the invention.

INDUSTRIAL APPLICABILITY

As apparent from the above description, embodiments of the present invention may be wholly or partially applied to a digital broadcasting system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for receiving a three dimensional (3D) broadcast signal, the method comprising:
receiving signaling information of at least one stream for a 3 Dimension TeleVision (3DTV) service and a two dimensional (2D) video stream;
demultiplexing at least one stream for the 3DTV service and the 2D video stream based on the signaling information;
decoding at least one demultiplexed stream for the 3DTV service and the demultiplexed 2D video stream; and
outputting a 3D video signal by formatting at least one decoded stream for the 3DTV service and the decoded 2D video stream,
wherein the signaling information is defined in a descriptor of a Virtual Channel Table (VCT) or a Program map Table (PMT),
wherein the VCT includes a service_type field identifying whether a virtual channel described by the VCT carries the 3DTV service,
wherein the signaling information includes:
a number_element field specifying a number of elements associated with the 3DTV service,
a data_type field identifying whether each of the elements carries occlusion information, or transparency information corresponding to the 2D video stream,
a codec_type field identifying a coding type applied for the occlusion information, or the transparency information,
a third field that identifies whether resolution of at least one stream for the 3DTV service is identical to that of the 2D video stream, and
a horizontal_size field indicating a horizontal size of a element included in the 3DTV service and a vertical_size field indicating a vertical size of the element when the third field indicates that the resolution of the at least one stream for the 3DTV service is different from that of the 2D video stream.

2. A method for transmitting a three dimensional (3D) broadcast signal, the method comprising:
acquiring multiple video information captured by at least two cameras;
formatting a two dimensional (2D) video stream extracted from the acquired multiple video information and signaling information of at least one stream for a 3 Dimension TeleVision (3DTV) service;
encoding the formatted 2D video stream and the formatted signaling information of at least one stream for the 3DTV service; and
transmitting the encoded 2D video stream and the encoded signaling information of at least one stream for the 3DTV service,
wherein the signaling information is defined in a descriptor of a Virtual Channel Table (VCT) or a Program map Table (PMT),
wherein the VCT includes a service_type field identifying whether a virtual channel described by the VCT carries the 3DTV service,
wherein the signaling information includes:
a number_element field specifying a number of elements associated with the 3DTV service,
a data_type field identifying whether each of the elements carries occlusion information, or transparency information corresponding to the 2D video stream,
a codec_type field identifying a coding type applied for the occlusion information, or the transparency information,
a third field that identifies whether resolution of at least one stream for the 3DTV service is identical to that of the 2D video stream, and
a horizontal_size field indicating a horizontal size of a element included in the 3DTV service and a vertical_ size field indicating a vertical size of the element when the third field indicates that the resolution of the at least one stream for the 3DTV service is different from that of the 2D video stream.

3. The method according to claim 2, wherein the encoding of the formatted 2D video stream and the formatted signaling information of at least one stream for the 3DTV service further includes:
encoding the formatted 2D video stream, the formatted signaling information of at least one stream for the 3DTV service, and a camera parameter.

4. The method according to claim 3, wherein the transmitting of the encoded 2D video stream and the encoded signaling information of at least one stream for the 3DTV service further includes:
transmitting the encoded 2D video stream, the encoded signaling information of at least one stream for the 3DTV service, and an encoded camera parameter.

5. The method according to claim 2, wherein the at least one stream for the 3DTV service corresponds to a stream including depth information corresponding to the 2D video stream, a stream including occlusion information, or a stream including transparency information.

6. A digital broadcast receiver for processing a three dimensional (3D) broadcast signal, the digital broadcast receiver comprising:
a tuner for receiving signaling information of at least one stream for a 3 Dimension TeleVision (3DTV) service and a two dimensional (2D) video stream;
a demultiplexer for demultiplexing at least one stream for the 3DTV service and the 2D video stream based on the signaling information;
a decoder for decoding at least one demultiplexed stream for the 3DTV service and the demultiplexed 2D video stream; and
a formatter for outputting a 3D video signal by formatting at least one decoded stream for the 3DTV service and the decoded 2D video stream,
wherein the signaling information is defined in a descriptor of a Virtual Channel Table (VCT) or a Program map Table (PMT),
wherein the VCT includes a service_type field identifying whether a virtual channel described by the VCT carries the 3DTV service,
wherein the signaling information includes:
a number_element field specifying a number of elements associated with the 3DTV service,
a data_type field identifying whether each of the elements carries occlusion information, or transparency information corresponding to the 2D video stream,
a codec_type field identifying a coding type applied for the occlusion information, or the transparency information,
a third field that identifies whether resolution of at least one stream for the 3DTV service is identical to that of the 2D video stream, and
a horizontal_size field indicating a horizontal size of a element included in the 3DTV service and a vertical_size field indicating a vertical size of the element when the third field indicates that the resolution of the at least one stream for the 3DTV service is different from that of the 2D video stream.

7. A digital broadcast transmitter for processing a three dimensional television (3DTV) broadcast signal, the digital broadcast transmitter comprising:
a detector for acquiring multiple video information captured by at least two cameras;
a formatter for formatting a two dimensional (2D) video stream extracted from the acquired multiple video information and signaling information of at least one stream for a 3 Dimension TeleVision (3DTV) service;
an encoder for encoding the formatted 2D video stream and the formatted signaling information of at least one stream for the 3DTV service; and
a transmitter for transmitting the encoded 2D video stream and the encoded signaling information of at least one stream for the 3DTV service,
wherein the signaling information is defined in a descriptor of a Virtual Channel Table (VCT) or a Program map Table (PMT),
wherein the VCT includes a service_type field identifying whether a virtual channel described by the VCT carries the 3DTV service,
wherein the signaling information includes:
a number_element field specifying a number of elements associated with the 3DTV service,
a data_type field identifying whether each of the elements carries occlusion information, or transparency information corresponding to the 2D video stream,
a codec_type field identifying a coding type applied for the occlusion information, or the transparency information,
a third field that identifies whether resolution of at least one stream for the 3DTV service is identical to that of the 2D video stream, and
a horizontal_size field indicating a horizontal size of a element included in the 3DTV service and a vertical_size field indicating a vertical size of the element when the third field indicates that the resolution of the at least one stream for the 3DTV service is different from that of the 2D video stream.

8. The digital broadcast transmitter according to claim 7, wherein the encoder encodes encoding the formatted 2D video stream, the formatted signaling information of at least one stream for the 3DTV service, and a camera parameter.

* * * * *